United States Patent
Eckert et al.

(10) Patent No.: US 10,795,802 B2
(45) Date of Patent: Oct. 6, 2020

(54) SYSTEMS AND METHODS FOR A REAL TIME EMBEDDED TRACE

(71) Applicant: Honeywell International Inc., Morris Plains, NJ (US)

(72) Inventors: Richard J. Eckert, Peoria, AZ (US); Jon Peters, Peoria, AZ (US); Ho Yin Tam, Peoria, AZ (US); Aaron Solorzano, Seattle, WA (US)

(73) Assignee: Honeywell International Inc., Morris Plains, NJ (US)

( * ) Notice: Subject to any disclaimer, the term of this patent is extended or adjusted under 35 U.S.C. 154(b) by 241 days.

(21) Appl. No.: 14/945,815

(22) Filed: Nov. 19, 2015

(65) Prior Publication Data

US 2017/0147472 A1 May 25, 2017

(51) Int. Cl.
*G06F 9/44* (2018.01)
*G06F 11/36* (2006.01)
*G06F 11/34* (2006.01)

(52) U.S. Cl.
CPC ...... *G06F 11/3636* (2013.01); *G06F 11/3466* (2013.01); *G06F 2201/805* (2013.01)

(58) Field of Classification Search
CPC .......... G06F 8/71; G06F 9/44505; G06F 8/20; G06F 8/61; G06F 8/36; G06F 11/3636; G06F 11/3466; G06F 2201/805

USPC ......................................................... 717/121
See application file for complete search history.

(56) References Cited

U.S. PATENT DOCUMENTS

| | | | |
|---|---|---|---|
| 6,055,492 A | 4/2000 | Alexander, III et al. | |
| 6,134,710 A * | 10/2000 | Levine ................. | G06F 8/4442 707/999.202 |
| 7,827,539 B1 | 11/2010 | Wygodny et al. | |
| 8,141,051 B2 | 3/2012 | Huang et al. | |
| 8,910,124 B1 | 12/2014 | Bhansali et al. | |
| 8,997,058 B2 | 3/2015 | Bohnet et al. | |
| 2014/0189314 A1 * | 7/2014 | Kurts ................. | G06F 9/30145 712/216 |
| 2014/0317603 A1 | 10/2014 | Gataullin et al. | |
| 2015/0095625 A1 * | 4/2015 | Hassanein .......... | G06F 9/30181 712/226 |

* cited by examiner

*Primary Examiner* — Chuck O Kendall
(74) *Attorney, Agent, or Firm* — Fogg & Powers LLC

(57) ABSTRACT

Systems and methods for a real time embedded trace are provided. In certain embodiments, a system for acquiring data that uses a real time embedded trace includes a first computing system. The first computing system includes a memory unit; and a processing unit executing software, wherein the software comprises at least one real time trace instruction. Further, the at least one real time trace instruction directs the processing unit to directly store data onto the memory unit; and wherein the stored data is translated for a user after it is stored onto the memory unit.

30 Claims, 4 Drawing Sheets

```
#ifdef OPTIMAL _TRACE
Trace (Unique_ID_1) ;
#else
```

FIG. 2

```
#ifdef OPTIMAL _TRACE
Trace (Unique_ID_12, Parameter_1);
#else
```

FIG. 3

```
#ifdef OPTIMAL _TRACE
Trace (Unique_ID_35, Parameter_1, Parameter_2);
#else
```

FIG. 4

```
#ifdef OPTIMAL _TRACE
Trace (Unique_ID_64, Parameter_1, Parameter_2, Parameter_3);
#else
```

FIG. 5

SYSTEMS AND METHODS FOR A REAL TIME EMBEDDED TRACE

BACKGROUND

Certain systems use embedded software to perform certain tasks. During the execution of embedded software, errors may arise in the execution. Sometimes, it can be difficult to identify the cause of the failure. Further, it can become more difficult to identify the cause of the error when the software is executing with limited resources such as slow processing capabilities and limited amounts of memory.

To identify the cause of the failure, programmers frequently place lines of code that direct the executing program to output data during execution, where the data provides information that could potentially direct the programmer to the cause of the failure. Frequently, print statements are used that output the desired data in a format that is useable to the debugging programmer. However, these print statements take processing time to process the data and create strings, which processing time frequently alters the timing of the executing program such that it may not be able to replicate the failure.

Also, it may be difficult to identify the error when the system generally operates in an environment that is inaccessible to the programmer when the failure occurs. For example, an aircraft may experience a failure during flight, where the failure is caused by conditions that arise during flight operations. Because the conditions arise during flight operations, it may be difficult or even impossible to replicate the cause of the failure in a lab. Further, due to limited processing, memory, and certification requirements, the programmer may not be able to place code that gathers information that may be helpful in identifying the failure.

SUMMARY

Systems and methods for a real time embedded trace are provided. In certain embodiments, a system for acquiring data that uses a real time embedded trace includes a first computing system. The first computing system includes a memory unit; and a processing unit executing software, wherein the software comprises at least one real time trace instruction. Further, the at least one real time trace instruction directs the processing unit to directly store data onto the memory unit; and wherein the stored data is translated for a user after it is stored onto the memory unit.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 is a section of code for acquiring information using a trace in one embodiment described in the present disclosure;

FIG. 3 is a section of code for acquiring information using a trace in one embodiment described in the present disclosure;

FIG. 4 is a section of code for acquiring information using a trace in one embodiment described in the present disclosure;

FIG. 5 is a section of code for acquiring information using a trace in one embodiment described in the present disclosure.

Figure 1:
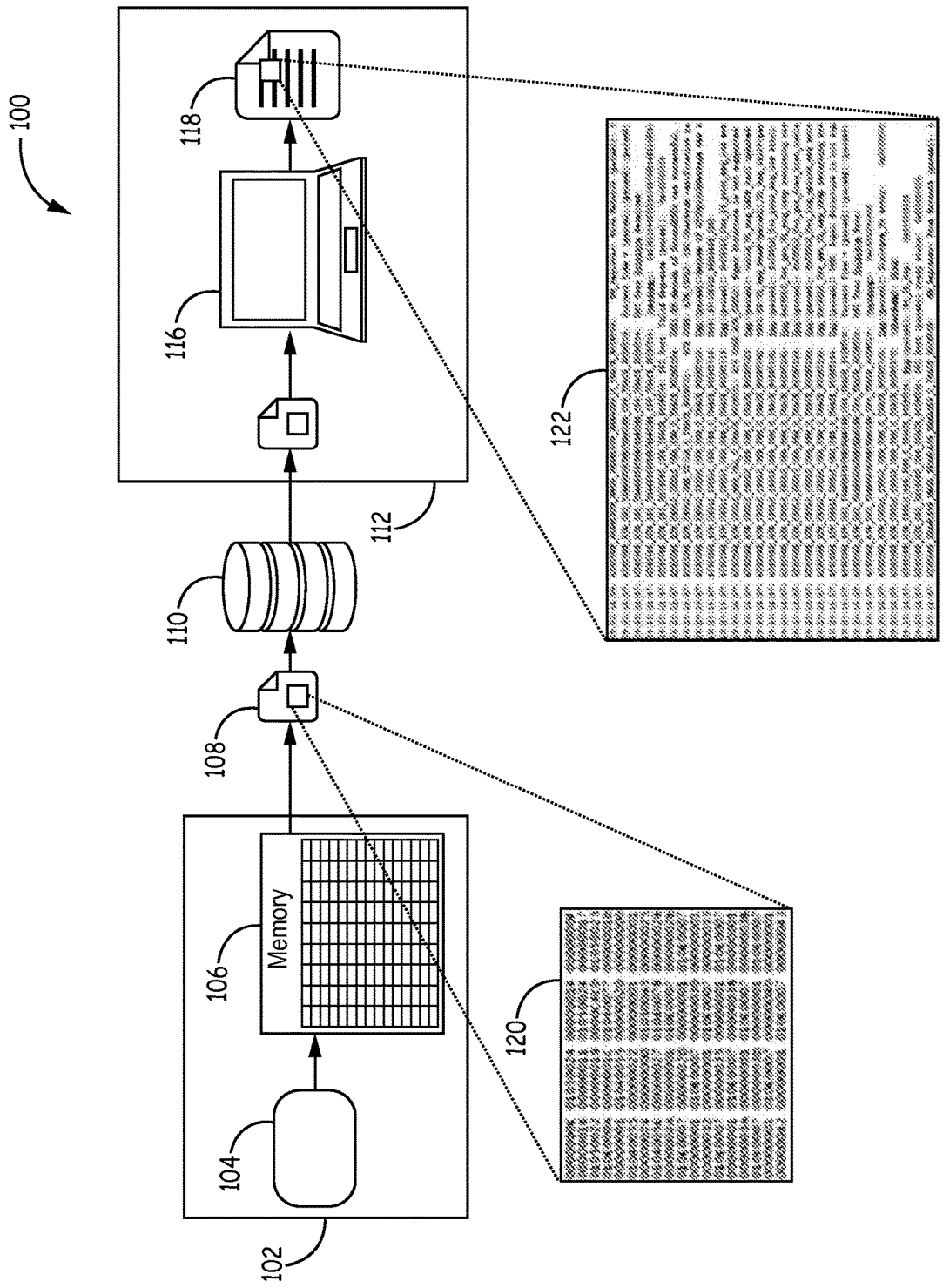
FIG. 1 illustrates an exemplary system for acquiring information using a real time embedded trace in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein provide for systems and methods for a real-time embedded trace in executing software code. For example, the real-time embedded trace may comprise a software library that includes trace functions that allow for the recording of many data parameters. The trace functions direct processors to write binary data directly to a trace collection facility. The binary data that is written to the trace collection facility is not encoded in a human readable format. For example, the binary data does not correspond with encodings such as ASCII or UNICODE. The trace collection facility may be allocated memory accessible to the processor executing the software code. For example, the trace collection facility may be a circular buffer in random access memory that is accessible to the processor. When the executing software code experiences a failure, the trace functions may be enabled to capture and write binary data to the trace collection facility. When the data is provided to a programmer, the software programmer may use a decoding tool to decode the binary data. After the decoding tool decodes the binary data into a human readable format, the programmer may use the acquired data to correct the failures in the executing software code.

FIG. 1 is a diagram of an exemplary system 100 for acquiring information that may aid a software programmer who is trying to identify failures in software executing on a processor 104, where the processor 104 executes on a platform 102. The platform 102 may be a system that executes embedded software. In at least one exemplary embodiment, the platform 102 may be an aircraft, a ground based vehicle, a boat, or any other system or device that executes embedded software. In certain embodiments, the processor 104 on the platform 102 may have limited performance capabilities. For example, the processor 104 may be more than 20 years. As such, the effects of the limited performance capabilities may make acquiring trace information difficult. For example, in the aircraft example, executing software is frequently subject to safety requirements such that the software must be certified before executing on the aircraft. As the processor 104 may be limited in the ability to execute software, the execution of traditional string-based trace codes in the software may significantly alter the timing of the application, making the application unable to execute in such a way that it can be certified and meet timing and performance requirements.

Trace codes are generally lines of software codes that instruct the processor 104 to provide information about the execution of the software. Frequently, the trace codes are print statements that direct the processor 104 to output the data into a file or print the data to a screen in a readable format such that a programmer can look at the information and identify the causes of errors in the software code. However, trace codes do not directly contribute to the execution of the software and when executed may negatively affect the execution of the software. For example, trace codes frequently include print statements that call other functions to acquire and format binary data such that the data can be presented to a user in a human readable format. The calling of other functions can significantly impact the timing of the execution of the software.

In embodiments described herein, real time trace instructions for producing binary data as described above are placed in the instructions executing on the processor 104. In certain implementations, the processor 104 includes or functions with software programs, firmware or other computer readable instructions for carrying out various methods, process tasks, calculations, and control functions of the platform 102. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media, which may comprise memory 106. For example, the memory 106 may include conventional hard disks, Compact Disk-Read Only Memory (CDROM), volatile or non-volatile media such as Random Access Memory (RAM) (including, but not limited to, Synchronous Dynamic Random Access Memory (SDRAM), Double Data Rate (DDR) RAM, RAM-BUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In certain embodiments, the real time trace instructions direct the processor 104 to directly move specified binary data into a desired location in memory 106. The memory 106 may have a buffer dedicated to storing the binary data that results from the real time trace instructions. In at least one implementation, when executing the real time trace instructions, the processor 104 will move binary data indicated in the trace instruction that directly represents a state of execution for an executing program into the memory 106. The binary data that is moved are binary representations of the data used by the executing program. Accordingly, the binary data can be stored into the memory 106 without converting the binary data into a character string or through calling other functions to output the data into a desired format. In certain implementations, identifying information may be appended to the binary data to form a data record.

In at least one implementation, where identifying information is appended to the binary data to form a data record, the data record may include three parts. One part of the data record may be a unique ID, the second part or the data record may include the time that the real time trace instruction was executed, and the third part of the data record may include from zero parameters to multiple parameters as requested by the trace instruction. In certain embodiments, the separate parts of the data records are constrained to particular data sizes. For example, the first part or identifier of the data record may take 1 word (4 bytes) of data in memory. Further, the identifier may be a unique identifier for each data record stored in memory. For example, the unique identifier may be a sequential numbering of data records, a hash code, and the like. In certain implementations, the unique identifier may be broken down into a functional area, a sub-functional area, and a unique code, where the functional area occupies the most significant byte, the sub-functional area occupies the next significant byte, and a unique code occupies the least significant 2 bytes.

In certain embodiments, when the binary data 120 has been stored into the memory 106, the binary data 120 may be ported from the memory 106 in a file 108 into a transportable data medium 110. In at least one exemplary implementation, this porting of the data into a transportable data medium may be performed at a later time, for example after a flight has completed, or a time when a platform executing the embedded software becomes accessible to a programmer or other individual tasked with acquiring the data. The transportable data medium 110 may be a hard drive. Alternatively, a file 108 may be transmitted via a wireless communication link. The binary file 108 is then provided to a tracing tool 112. The trace decoder tool 112 may include computational facilities 116 that are able to decode the binary data 120 in the file 108 and form a debugging information file 118, where the debugging information file 118 contains readable text 122. In one implementation, where the platform 102 is an aircraft, the trace decoder tool 112 may be a ground based trace decoder tool. Alternatively, the trace decoder tool 112 may be located at any location where the trace decoder tool 112 has access to the binary file 108 to decode the binary file 108 to create the debugging information file 118. For example, the trace decoder tool 112 may reside on the platform 102. Also, the trace decoder tool may be comprised of executable codes that are executed by the processing unit 104.

In further implementations, the execution of the real time trace instructions are able to be enabled or disabled during the execution of the platform 102. For example, the execution of the real time trace instructions may be enabled based on triggers (such as a sentinel value) that arise in the executing code, similarly a threshold value may be placed to indicate when to enable triggers. Alternatively, a condition may arise independently of the executing code that may provide a trigger for enabling the execution of real time trace instructions. For instance, the execution of a real time trace instruction may be enabled based on the time, or an interrupt received from a connected device. In a further implementation, the execution of the real time trace instructions may be enabled through a human machine interface. For example, a software programmer, may connect a device having the human machine interface to the platform 102 (or the platform 102 may provide a human machine interface) that provides access to values used by the processor 104 in executing the real time trace instructions. The software programmer may then change the values and enable the execution of the real time trace instructions. Further, the enabling of the execution of the real time trace functions is configurable as a programmer may enable only a portion of the available real time trace functions. In one particular example, where the platform 102 is not accessible to the programmer during operation, the execution of the desired real time trace instructions may be enabled at the beginning of operation and disabled at a future moment as desired by the programmer through the human machine interface. Thus, the real time trace instructions may execute when directed according to the desire to gather trace information.

In summation, the system for a real time embedded trace may consist of a library of real-time trace instructions. In certain implementations, the library may be included as part of a software baseline, where the library is flexible and generic enough to be acquire runtime information desired by a developer. Further, the library will also be flexible enough such that trace points found in previously developed software may be translated into real-time trace instructions. As such, strings within old trace invocations in previously developed software may be converted to an enumerated value. Further, the real-time trace instructions may permit the recording of multiple parameters. In at least one implementation, the library of real time trace instructions may be portable to multiple platforms. For example, the library may provide a common API and a porting layer to permit portability.

In certain embodiments, and as described below, a real-time trace instruction may be in the form of a single function call that writes directly to memory storage. The single function may bypass inefficient trace facilities and the single function may execute without extra function calls and associated processing. When the real time trace instruction writes to memory, the data written to memory may include a unique header and the associated trace text. For example, the saved data may include a unique identifier, the time that the real time trace instruction was executed, and any parameters identified in the real time trace instruction.

FIGS. 2-5 provide exemplary implementations of possible real-time trace instructions that could be used to write data to memory. For example FIG. 2 illustrates a real-time trace instruction "Trace". As illustrated the instruction has the single identifier "Unique_ID_1," which identifier is stored into memory, and may be defined in the code as a constant. When the real-time trace instruction is executed. The processor stores the constant "Unique_ID_1" directly in memory as binary data. Further, as illustrated in FIG. 3, a single parameter may be saved in conjunction with an identifier. For example, as illustrated in FIG. 3, a real time trace instruction "Trace" is may also be capable of saving a parameter to memory. For example, upon execution of the function call, the processing unit may store the parameter "parameter1" to memory. FIG. 4-5 illustrates other examples of a real-time trace instructions that can save multiple parameters to memory using a real time trace instruction. As illustrated in FIG. 4, a real time trace instruction "Trace" is capable of saving two different parameters to memory. For example, upon execution of the function call, the processing unit may store binary data representing the parameters "parameter1" and "parameter2". In a similar fashion, FIG. 5 illustrates a real time trace instruction "Trace" that is capable of saving three different parameters to memory. For example, upon execution of the function call, the processing unit may store binary data representing the parameters "parameter1," "parameter2," and "parameter3". Through the use of a trace function, parameters may be directly stored to memory without calling further functions.

Figure 6:
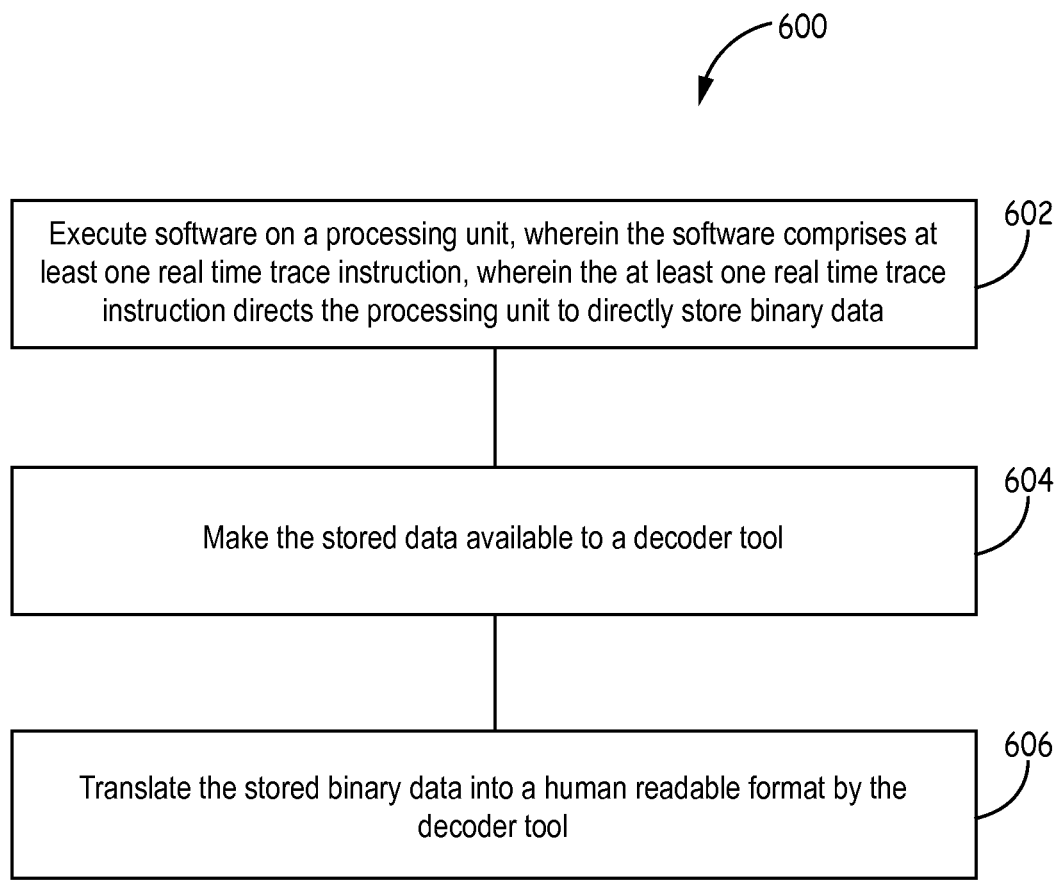
FIG. 6 is a flow diagram for a method for acquiring information using a trace in one embodiment described in the present disclosure.

FIG. 6 is a flow diagram of a method 600 for acquiring real time trace information from an executing computer program. For example, method 600 proceeds at 602 where software is executed on a processing unit, wherein the software comprises at least one real time trace instruction, wherein the at least one real time trace instruction directs the processing unit to directly store binary data. When the software is executed, the method 600 proceeds at 604, where the stored data is made available to a decoder tool. For example, the processing unit may direct the stored binary data to be transmitted through a communication link or transported on a computer readable medium to a second computing system that includes a decoder tool. Alternatively, the decoder tool may exist as separate executing software on the first computing system.

In certain implementations, the method 600 proceeds at 606, where the stored binary data is translated into a human readable format by the decoder tool. For example, a second processing unit may execute the decoder tool software to translate the stored binary data into a format that is human readable. Whereupon a software developer can use the translated data to identify errors that may exist in the executing software code.

EXAMPLE EMBODIMENTS

Example 1 includes a system for acquiring data, the system comprising: a first computing system comprising: a memory unit; and a processing unit executing software, wherein the software comprises at least one real time trace instruction; wherein the at least one real time trace instruction directs the processing unit to directly store data onto the memory unit; and wherein the stored data is translated for a user after it is stored onto the memory unit.

Example 2 includes the system of Example 1, further comprising: a second computing system, the second computing system comprising: a second processing unit executing a trace decoder tool, wherein the trace decoder tool translates the stored data for a user.

Example 3 includes the system of Example 2, wherein the stored data is transmitted to the second computing system via at least one of: a computer readable storage medium; and a wireless communication link.

Example 4 includes the system of any of Examples 1-3, wherein the stored data is saved onto the memory unit in a structured data record.

Example 5 includes the system of Example 4, wherein the structured data record comprises at least one of: an identifier configured to identify the stored data; a time that the stored data was used by the executing software; and at least one parameter representing the stored binary data.

Example 6 includes the system of Example 5, wherein the identifier comprises at least one of: a functional area; a sub-functional area; and a unique code.

Example 7 includes the system of any of Examples 1-6, wherein the stored data becomes convertible into the human readable format when the system becomes accessible to a human.

Example 8 includes the system of any of Examples 1-7, wherein the processing unit executes the real time trace instructions when the real time trace instructions are enabled.

Example 9 includes the system of Example 8, wherein a real time trace instruction in the at least one real time instruction is enabled and disabled through at least one of: a sentinel value in the executing software; an interrupt from other electrical devices; and an interrupt provided through a human machine interface.

Example 10 includes the system of any of Examples 1-9, wherein the data is binary data that is not in a human readable format.

Example 11 includes a method for acquiring trace information during software execution, the method comprising: executing software on a processing unit, wherein the software comprises at least one real time trace instruction, wherein the at least one real time trace instruction directs the processing unit to directly store data onto a memory unit; making the stored data available to a trace decoder tool; and translating the stored data for a user by the trace decoder tool.

Example 12 includes the method of Example 11, wherein making the stored data available to the trace decoder tool comprises: transmitting the stored data to a second computing system, wherein the second computing system executes the trace decoder tool.

Example 13 includes the method of Example 12, wherein transmitting the stored data to the second computing system comprises at least one of: storing the stored data on a computer readable storage medium; and transmitting the stored data over a wireless communication link.

Example 14 includes the method of any of Examples 11-13, wherein the stored data is saved onto the memory unit in a structured data record.

Example 15 includes the method of Example 14, wherein the structured data record comprises at least one of: an identifier configured to identify the stored data; a time that the stored data was used by the executing software; and at least one parameter representing the stored data.

Example 16 includes the method of Example 15, wherein the identifier is a unique identifier for each structured data record.

Example 17 includes the method of Example 16, wherein the unique identifier comprises at least one of: a functional area; a sub-functional area; and a unique code.

Example 18 includes the method of any of Examples 11-17, wherein the stored data is stored on a circular buffer on the memory unit.

Example 19 includes the method of any of Examples 11-18, wherein the processing unit executes the real time trace instructions when the real time trace instructions are enabled.

Example 20 includes the system of Example 19, wherein a real time trace instruction in the at least one real time instruction is enabled and disabled through at least one of: a sentinel value in the executing software; an interrupt from other electrical devices; and an interrupt provided through a human machine interface.

Example 21 includes a system, the system comprising: a computing system, the computing system comprising: a processing unit executing software; and a memory unit; wherein the software comprises at least one trace instruction, wherein the at least one trace instruction directs the processing unit to make data about the execution of the software available to a user, wherein a trigger determines whether the real time instruction is executed by the first processing unit.

Example 22 includes the system of Example 21, wherein the trigger comprises at least one of: a sentinel value in the code, an interrupt from other electrical devices; and an interrupt provided through a human machine interface.

Example 23 includes the system of any of Examples 21-22, wherein the trigger is enabled upon startup of execution and disabled by a user after execution begins.

Example 24 includes the system of any of Examples 21-23, wherein the at least one trace instruction directs the processing unit to directly store data onto the memory unit; and wherein the stored data is translated for a user after it is stored onto the memory unit by a trace decoder tool.

Example 25 includes the system of Example 24, wherein making the stored data available to the trace decoder tool comprises: transmitting the stored data to a second computing system, wherein the second computing system executes the trace decoder tool, wherein transmitting the stored data to the second computing system comprises at least one of: storing the stored data on a computer readable storage medium; and transmitting the stored data over a wireless communication link.

Example 26 includes a method for acquiring trace information during software execution, the method comprising: executing software on a processing unit, wherein the software comprises at least one trace instruction and at least one trigger; enabling the trigger; and executing the at least one trace instruction to make execution data available to a user when the trigger is enabled.

Example 27 includes the method of Example 26, wherein the trigger comprises at least one of: a sentinel value in the code, an interrupt from other electrical devices; and an interrupt provided through a human machine interface.

Example 28 includes the method of any of Examples 26-27, wherein the trigger is enabled upon startup of execution and disabled by a user after execution begins.

Example 29 includes the system of any of Examples 26-28, wherein the at least one trace instruction directs the processing unit to directly store data onto the memory unit; and wherein the stored data is translated for a user after it is stored onto a memory unit by a trace decoder tool.

Example 30 includes the system of Example 29, wherein making the stored data available to the trace decoder tool comprises: transmitting the stored data to a second computing system, wherein the second computing system executes the trace decoder tool, wherein transmitting the stored data to the second computing system comprises at least one of: storing the stored data on a computer readable storage medium; and transmitting the stored data over a wireless communication link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A system for acquiring data, the system comprising:
 a first computing system comprising:
  a memory unit; and
  a processing unit executing software, wherein the software comprises at least one real time trace instruction, wherein the at least one real time trace instruction is a high level instruction inserted into the executing software from a software library, wherein high level instructions in the software library allow for the recording of a plurality of data parameters;
  wherein execution of the at least one real time trace instruction directs the processing unit to directly store non-executable data onto the memory unit; and
 wherein the stored data is translated for a user after it is stored onto the memory unit.

2. The system of claim 1, further comprising:
 a second computing system, the second computing system comprising:
  a second processing unit executing a trace decoder tool, wherein the trace decoder tool translates the stored data for a user.

3. The system of claim 2, wherein the stored data is transmitted to the second computing system via at least one of:
 a computer readable storage medium; and
 a wireless communication link.

4. The system of claim 1, wherein the stored data is saved onto the memory unit in a structured data record.

5. The system of claim 4, wherein the structured data record comprises at least one of:
   an identifier configured to identify the stored data;
   a time that the stored data was used by the executing software; and
   at least one parameter representing the stored binary data.

6. The system of claim 5, wherein the identifier comprises at least one of:
   a functional area;
   a sub-functional area; and
   a unique code.

7. The system of claim 1, wherein the stored data becomes convertible into the human readable format when the system becomes accessible to a human.

8. The system of claim 1, wherein the processing unit executes the real time trace instructions when the real time trace instructions are enabled.

9. The system of claim 8, wherein a real time trace instruction in the at least one real time instruction is enabled and disabled through at least one of:
   a sentinel value in the executing software;
   an interrupt from other electrical devices; and
   an interrupt provided through a human machine interface.

10. The system of claim 1, wherein the data is binary data that is not in a human readable format.

11. A method for acquiring trace information during software execution, the method comprising:
   executing software on a processing unit, wherein the software comprises at least one real time trace instruction, wherein execution of the at least one real time trace instruction directs the processing unit to directly store non-executable data onto a memory unit and the at least one real time trace instruction is a high level instruction inserted into the executing software from a software library, wherein high level instructions in the software library allow for the recording of a plurality of data parameters;
   making the stored data available to a trace decoder tool; and
   translating the stored data for a user by the trace decoder tool.

12. The method of claim 11, wherein making the stored data available to the trace decoder tool comprises:
   transmitting the stored data to a second computing system, wherein the second computing system executes the trace decoder tool.

13. The method of claim 12, wherein transmitting the stored data to the second computing system comprises at least one of:
   storing the stored data on a computer readable storage medium; and
   transmitting the stored data over a wireless communication link.

14. The method of claim 11, wherein the stored data is saved onto the memory unit in a structured data record.

15. The method of claim 14, wherein the structured data record comprises at least one of:
   an identifier configured to identify the stored data;
   a time that the stored data was used by the executing software; and
   at least one parameter representing the stored data.

16. The method of claim 15, wherein the identifier is a unique identifier for each structured data record.

17. The method of claim 16, wherein the unique identifier comprises at least one of:
   a functional area;
   a sub-functional area; and
   a unique code.

18. The method of claim 11, wherein the stored data is stored on a circular buffer on the memory unit.

19. The method of claim 11, wherein the processing unit executes the real time trace instructions when the real time trace instructions are enabled.

20. The method of claim 19, wherein a real time trace instruction in the at least one real time instruction is enabled and disabled through at least one of:
   a sentinel value in the executing software;
   an interrupt from other electrical devices; and
   an interrupt provided through a human machine interface.

21. A system, the system comprising:
   a computing system, the computing system comprising:
      a processing unit executing software; and
      a memory unit;
      wherein the software comprises at least one real time trace instruction, wherein the at least one real time trace instruction directs the processing unit to make non-executable data about the execution of the software available to a user, wherein a trigger determines whether the at least one real time trace instruction is executed by the first processing unit, wherein the at least one real time trace instruction is a high level instruction inserted into the software from a software library, wherein high level instructions in the software library allow for the recording of a plurality of data parameters.

22. The system of claim 21, wherein the trigger comprises at least one of:
   a sentinel value in the code;
   an interrupt from other electrical devices; and
   an interrupt provided through a human machine interface.

23. The system of claim 21, wherein the trigger is enabled upon startup of execution and disabled by a user after execution begins.

24. The system of claim 21, wherein the at least one trace instruction directs the processing unit to directly store data onto the memory unit; and
   wherein the stored data is translated for a user after it is stored onto the memory unit by a trace decoder tool.

25. The system of claim 24, wherein making the stored data available to the trace decoder tool comprises:
   transmitting the stored data to a second computing system, wherein the second computing system executes the trace decoder tool, wherein transmitting the stored data to the second computing system comprises at least one of:
   storing the stored data on a computer readable storage medium; and
   transmitting the stored data over a wireless communication link.

26. A method for acquiring trace information during software execution, the method comprising:
   executing software on a processing unit, wherein the software comprises at least one trace instruction and at least one trigger, wherein the at least one trace instruction is a high level instruction inserted into the executing software from a software library, wherein high level instructions in the software library allow for the recording of a plurality of data parameters;
   enabling the trigger; and
   executing the at least one trace instruction to make non-executable data about execution of the software available to a user when the trigger is enabled.

27. The method of claim 26, wherein the trigger comprises at least one of:

a sentinel value in the code;

an interrupt from other electrical devices; and an interrupt provided through a human machine interface.

28. The method of claim 26, wherein the trigger is enabled upon startup of execution and disabled by a user after execution begins.

29. The method of claim 26, wherein the at least one trace instruction directs the processing unit to directly store data onto the memory unit; and wherein the stored data is translated for a user after it is stored onto a memory unit by a trace decoder tool.

30. The method of claim 29, wherein making the stored data available to the trace decoder tool comprises:

transmitting the stored data to a second computing system, wherein the second computing system executes the trace decoder tool, wherein transmitting the stored data to the second computing system comprises at least one of:

storing the stored data on a computer readable storage medium; and transmitting the stored data over a wireless communication link.

\* \* \* \* \*